(12) United States Patent
Kurata (10) Patent No.: US 7,394,357 B2
(45) Date of Patent: Jul. 1, 2008

(54) WHEEL CONDITION DETERMINATION APPARATUS

(75) Inventor: Fumito Kurata, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 149 days.

(21) Appl. No.: 11/376,312

(22) Filed: Mar. 16, 2006

(65) Prior Publication Data

US 2006/0249323 A1 Nov. 9, 2006

(30) Foreign Application Priority Data

Apr. 20, 2005 (JP) ............................. 2005-122334

(51) Int. Cl.
*B60C 23/00* (2006.01)
*G01R 13/30* (2006.01)
(52) U.S. Cl. ...................................... 340/447; 73/146.5
(58) Field of Classification Search ......... 340/442–447, 340/539.1, 539.3; 73/146.5, 145–145.6; 200/61.22
See application file for complete search history.

(56) References Cited

U.S. PATENT DOCUMENTS 6,271,748 B1 8/2001 Derbyshire et al.
6,545,599 B2 * 4/2003 Derbyshire et al. ......... 340/442
2004/0061601 A1 4/2004 Freakes et al.
2005/0156722 A1 * 7/2005 McCall et al. ............... 340/447

FOREIGN PATENT DOCUMENTS

| GB | 2 373 863 A | 10/2002 |
|---|---|---|
| JP | A 11-20427 | 1/1999 |
| JP | A 11-240315 | 9/1999 |
| JP | A 11-254926 | 9/1999 |
| WO | WO 2005/030498 A1 | 4/2005 |

OTHER PUBLICATIONS

U.S. Appl. No. 10/566,833, filed Feb. 2, 2006.

* cited by examiner

*Primary Examiner*—Davetta W. Goins
*Assistant Examiner*—Sigmund Tang
(74) *Attorney, Agent, or Firm*—Oliff & Berridge, PLC (57) ABSTRACT

A wheel condition determination apparatus includes a primary sensor unit and a secondary sensor unit that are provided in the wheels of a vehicle. The primary sensor unit detects a predetermined parameter indicating the condition of the wheel and controls the operation mode of the secondary sensor unit in accordance with the detected predetermined parameter. The secondary sensor unit detects a predetermined parameter indicating the condition of the wheel that is different from the predetermined parameter detected by the primary sensor unit. The operation mode of the secondary sensor unit may be changed between an active mode and a sleep mode. In the sleep mode, detection of the wheel condition may be suspended or performed less frequently than as the active mode.

8 Claims, 5 Drawing Sheets

WHEEL CONDITION DETERMINATION APPARATUS

The disclosure of Japanese Patent Application No. 2005-122334 filed on Apr. 20, 2005 including the specification, drawings and abstract is incorporated herein by reference in its entirety.

BACKGROUND OF THE INVENTION

1. Field of the Invention

The invention relates to a wheel condition determination apparatus that determines the condition of a wheel provided in a vehicle.

2. Description of the Related Art

Japanese Patent Application Publication No. JP-A-11-240315 describes an example of an apparatus that determines the condition of a wheel provided in a vehicle. The apparatus includes a tire tag and a transponder. The tire tag, provided inside a tire, includes a sensor and a battery. The sensor detects a predetermined parameter indicating the wheel condition. The transponder, provided in the wheel rim, transmits the parameter detected by the sensor of the tire tag to the vehicle. Japanese Patent Application Publication No. JP-A-11-254926 also describes an apparatus that determines the condition of a wheel. The apparatus includes a unit, provided in the wheel rim, that includes a sensor, a battery, a microchip, and an antenna. The sensor detects a predetermined parameter indicating the wheel condition. The unit transmits the parameter detected by the sensor to the vehicle.

In the described apparatuses, the battery can supply electric power for a relatively long period. However, the amount of electric power supplied to the sensor and related components should be minimized to determine the wheel condition for a long time. Japanese Patent Application Publication No. JP-A-11-020427 describes an example of a tire air-pressure detection apparatus for a wheel. The tire air-pressure detection apparatus includes an air-pressure sensor, a transceiver, and a centrifugal-force switch that is turned on when centrifugal force generated by the rotation of a wheel becomes equal to or greater than a predetermined value. The air-pressure sensor detects the air pressure and the transceiver transmits and receives data only when the centrifugal-force switch is ON, that is, only when the vehicle is moving. This reduces the amount of electric power consumed to determine the wheel condition.

The information useful for improving the running performance and safety of the vehicle includes not only the aforementioned tire air-pressure but also other parameters. Therefore, a technology where a plurality of sensor units are provided in a wheel, and each sensor detects a different parameter indicating the wheel condition has been recently proposed. In this technology as well, the amount of electric power required for detection of the condition of the wheel and data communication should be minimized. However, if the centrifugal-force switch is provided in each of the plurality of sensor units as in the conventional tire air-pressure detection apparatus, the cost of the entire apparatus increases, and each sensor unit occupies a large space.

SUMMARY OF THE INVENTION

The invention provides a wheel condition determination apparatus that can reduce the amount of electric power required to detect the condition of a wheel while suppressing increases in the cost of the apparatus and the space occupied by the apparatus.

A first aspect of the invention relates to a wheel condition determination apparatus that determines the condition of a wheel provided in a vehicle. The wheel condition determination apparatus includes a primary sensor unit and a secondary sensor unit. The primary and secondary sensor units are provided in the wheel. The primary sensor unit includes a transceiver, a detector, and an operation-mode controller. The detector of the primary sensor unit ("first detector") detects a first predetermined parameter indicating the condition of the wheel. The operation-mode controller instructs the transceiver of the primary sensor unit ("first transceiver") to generate a mode setting signal that sets the operation mode of the secondary sensor unit to an active mode or a sleep mode according to the first predetermined parameter detected by the first detector. The secondary sensor unit also includes transceiver and a detector. The detector of the secondary sensor unit ("second detector") detects a second predetermined parameter indicating the condition of the wheel that is different from the first predetermined parameter detected by the first detector.

In the wheel condition determination apparatus, the operation mode of the secondary sensor unit is changed between the active mode and the sleep mode. In the active mode, the second detector is operated, and the second predetermined parameter indicating the wheel condition is detected and transmitted. In the sleep mode, detection and transmission of the second predetermined parameter may be suspended or performed less frequently than in the active mode. The primary sensor unit includes the first detector, which detects the first predetermined parameter indicating the condition of the wheel that is different from the second predetermined parameter detected by the second detector in the secondary sensor unit. The primary sensor unit changes the operation mode of the secondary sensor unit according to the first predetermined parameter detected by the first detector. With this configuration of the wheel condition determination apparatus, the operation mode of the secondary sensor unit can be changed between the active mode and the sleep mode according to the first predetermined parameter detected by the first detector. Therefore, in the wheel condition determination apparatus, by changing the operation mode of the secondary sensor unit to the sleep mode according to the first predetermined parameter detected by the first detector, the amount of electric power required to detect and transmit the wheel condition can be reduced.

Also, because the primary sensor unit changes the operation mode of the secondary sensor unit, it is not necessary to provide detection means used to change the operation mode in the secondary sensor unit. This reduces the cost of the apparatus as well as the space required by the apparatus that would otherwise be needed by providing such means in the secondary sensor unit. Thus, according to the aspect of the invention, the amount of electric power required to detect the wheel condition can be reduced while suppressing the increases in the cost of the apparatus and the space occupied by the apparatus. As described above, in the sleep mode, detection and transmission of the wheel condition may be suspended or performed less frequently than in the active mode.

A second aspect of the invention relates to a method of determining the condition of a wheel provided in a vehicle. According the method, a first predetermined parameter indicating the condition of the wheel is detected using a first detector provided in a primary sensor unit provided in a wheel. A mode-setting signal is generated in a first transceiver, which is provided in the primary sensor unit. The mode-setting signal is transmitted to a secondary sensor unit provided in the wheel to set an operation mode of the secondary sensor unit to one of an active mode and a sleep mode, based on the first predetermined parameter.

BRIEF DESCRIPTION OF THE DRAWINGS

The above mentioned and other features, advantages, technical and industrial significance of this invention will be better understood by reading the following detailed description of exemplary embodiments of the invention, when-considered in connection with the accompanying drawings, in which.

DETAILED DESCRIPTION OF THE EXEMPLE EMBODIMENTS

Hereinafter, an example embodiment of the invention will be described in detail with reference to the drawings.

Figure 1:
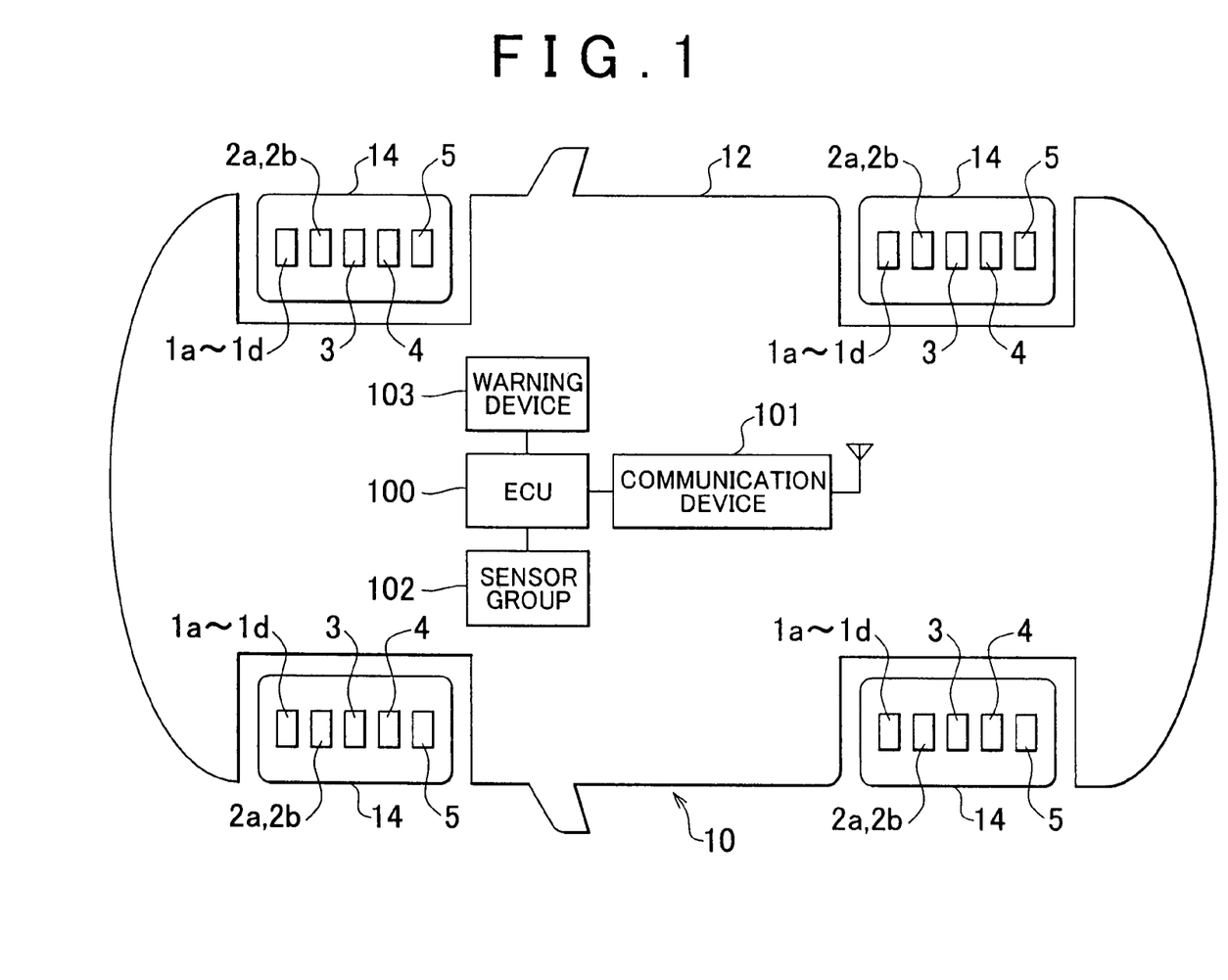
FIG. 1 illustrates a schematic diagram showing the configuration of a vehicle provided with a wheel condition determination apparatus according to the invention.
Figure 2:
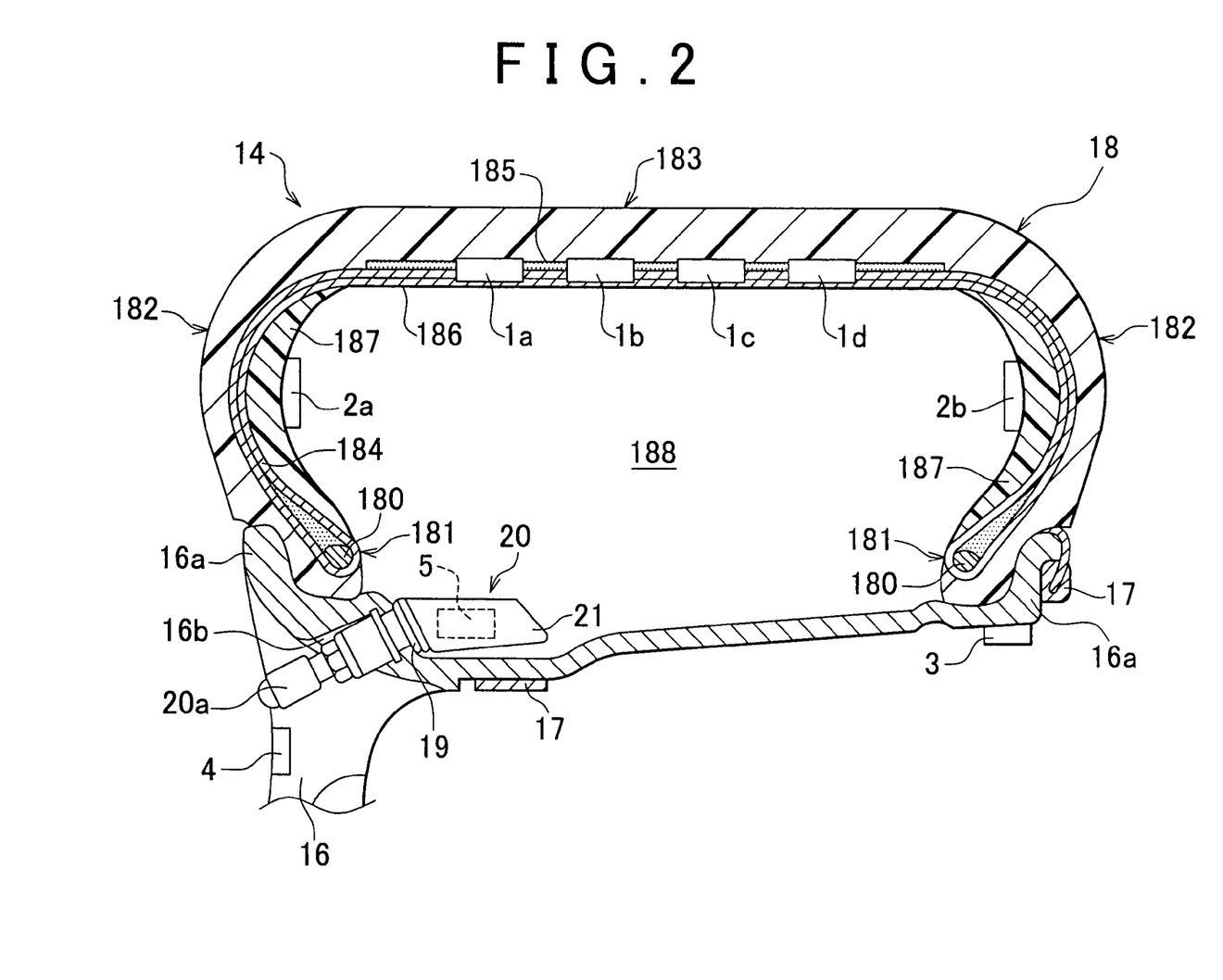
FIG. 2 illustrates a partial cross sectional view showing a wheel provided in the vehicle shown in FIG. 1.

FIG. 1 shows a schematic diagram of the configuration of a vehicle provided with a wheel condition determination apparatus according to the invention. FIG. 2 shows a partial cross sectional view of a wheel provided in the vehicle shown in FIG. 1. In FIG. 1, the vehicle 10 includes a vehicle body 12; four wheels 14; a steering device (not shown) that steers steering wheels among the four wheels 14; and a driving power source (not shown) that drives driving wheels among the four wheels 14. Each wheel 14 includes a disc-wheel 16; and a tire 18. In this embodiment, a so-called run flat tire is employed as the tire 18 that constitutes the wheel 14. However, an ordinary tire other than the run flat tire may be employed as the tire 18.

As shown in FIG. 2, the tire 18 is a self-supporting type run flat tire. Run flat tires are designed to allow a vehicle to run even when the tire air pressure decreases. As shown in FIG. 2, the tire 18 includes paired bead portions 181; paired side wall portions 182; and a tread portion 183. A bead core 180 is buried in each bead portion 181. Each side wall portion 182 extends outwardly from the bead portion 181 in the radial direction of the tire 18. The tread portion 183 is provided between both of the side wall portions 182. A ply 184 is buried in the paired bead portions 181, the paired side wall portions 182, and the tread portion 183. For example, the ply 184 is formed using one piece of fabric material. In the tread portion 183, a belt layer 185 is buried outside the ply 184. In each side wall portion 182, a reinforcing rubber wall 187 is buried inside an inner liner 186.

Each reinforcing rubber wall 187 has high stiffness. When there is a loss of air pressure inside the space 188 defined by the disc-wheel 16 and the tire 18 due to tire blowout or the like, each reinforcing rubber wall 187 supports the entire tire 18 on the disc-wheel 16. Therefore, the vehicle can move even with the loss of air pressure. The tire 18 provided in the vehicle 10 is not limited to the self-supporting type run flat tire. The tire 18 may be an auxiliary supported run flat tire that includes a support ring that supports the entire tire 18 on the disc-wheel 16 when there is a loss of air pressure inside the space 188. A balance weight 17 is appropriately implanted in the disc-wheel 16 or attached to the disc-wheel 16.

As shown in FIG. 1 and FIG. 2, sensor units 1a, 1b, 1c, and 1d (hereinafter, may be collectively referred to as "sensor unit 1") and sensor units 2a and 2b (hereinafter, may be collectively referred to as "sensor unit 2"), and sensor units 3 and 4 are provided in each wheel 14. Each of the sensor units 1 to 4 detects and transmits a predetermined parameter indicating the condition of the wheel. The sensor units 1 to 4 may be considered as the secondary sensor units according to the invention. Each of the sensor units 1 to 4 includes a sensor that detects a predetermined parameter indicating the wheel condition. The sensors may be considered as the second detection means according to the invention. The operation mode of each of the sensor units 1 to 4 is changed between an active mode and a sleep mode. In the active mode, the predetermined parameter indicating the wheel condition is detected by the sensor, and the detected wheel condition is transmitted. In the sleep mode, detection and transmission of the predetermined parameter may be suspended or performed less frequently than in the active mode.

Sensor units 1a to 1d are buried in the tread portion 183 of each wheel 14 and detect the ground contact pressure at the tread portion 183 of each wheel 14. Sensor units 2a and 2b are fitted inside the sidewall portion 182 of each wheel 14 where they detect the temperature of the sidewall portion 182 and the shoulder portion of each wheel 14. The sensor unit 3 is fitted on the inner surface of a disc-wheel rim 16a of the disc-wheel 16 and detects the collision of any foreign objects with the disc-wheel rim 16a. Further, the sensor unit 4 is fitted on the outer surface of the corresponding disc-wheel 16 and detects the lateral acceleration of the wheel 14.

A sensor unit 5 is also provided in each wheel 14. The sensor unit 5 includes a sensor that is employed as the first detection means according to the invention. The sensor in the sensor unit 5 detects a predetermined wheel condition parameter that differs from the parameters detected by the sensors in the sensor units 1 to 4. The operation mode of each of the sensor units 1 to 4 is governed according to the parameter detected by the sensor in the sensor unit 5. In this embodiment, the sensor unit 5 is integrated with a tire pressure monitoring system ("TPMS") valve 20. The TPMS valve 20 adjusts the air pressure of the tire 18 that constitutes the wheel 14.

The TPMS valve 20 is fitted in a hole 16b provided in the disc-wheel rim 16a of the disc-wheel 16 using a grommet 19 made of elastic rubber, a washer, and a bolt. The grommet 19 has predetermined stiffness, and seals the space 188 in the air-tight manner. A valve cap 20a of the TPMS valve 20 protrudes outwardly from the disc-wheel rim 16a. By removing the valve cap 20a, and connecting the hose pipe of an air supply device to the opening (not shown) of the TPMS valve 20, air can be supplied into the space 188. Also, as shown in FIG. 2, the TPMS valve 20 includes a housing 21 that protrudes into the space 188. The sensor unit 5 may be provided inside the housing 21.

It should be understood that the positioning of the sensor units 1 to 5 and the parameters detected by the sensor units 1 to S5 are not limited to the configurations as described above. That is, the positions at which the sensor units 1 to 5 are provided may be combined with the parameters detected by the sensor units 1 to 5 in any manner.

Figure 3:
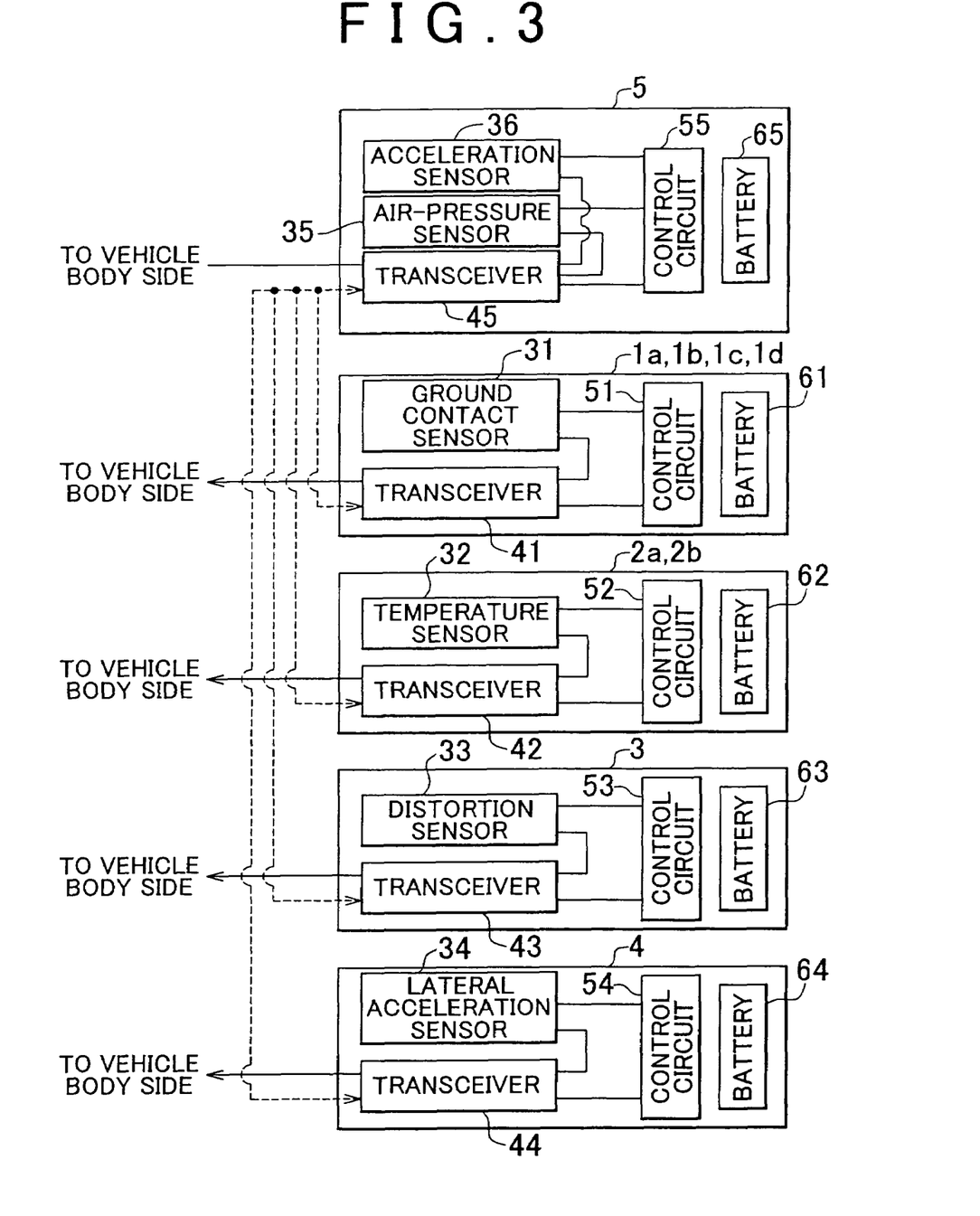
FIG. 3 illustrates a block diagram explaining the configuration of each sensor unit provided in each wheel of the vehicle shown in FIG. 1.

FIG. 3 illustrates a block diagram explaining the configurations of the sensor units 1 to 5 provided in each wheel 14. As shown in FIG. 3, each of the sensor units 1a to 1d includes a ground contact pressure sensor 31; a transceiver 41; a control circuit 51; and a battery 61. The ground contact pressure sensor 31 detects the ground contact pressure at the tread portion 183. The transceiver 41 transmits and receives, for example, a signal indicating the value detected by the ground contact pressure sensor 31. The control circuit 51, provided in an integrated circuit chip or the like, controls the ground contact pressure sensor 31 and the transceiver 41. The battery 61 supplies electric power to the sensor 31, the transceiver 41, and the control circuit 51. Each of the sensor units 2a and 2b includes a temperature sensor 32; a transceiver 42; a control circuit 52; and a battery 62. The transceiver 42 transmits and receives, for example, a signal indicating the value detected by the temperature sensor 32. The control circuit 52 controls the temperature sensor 32 and the transceiver 42. The battery 62 supplies electric power to the sensor 32, the transceiver 42, and the control circuit 52.

As shown in FIG. 3, the sensor unit 3 includes a distortion sensor 33; a transceiver 43; a control circuit 53; and a battery 63. The distortion sensor 33 detects the collision of a foreign object or the like with the disc-wheel 16. The transceiver 43 transmits and receives, for example, a signal indicating the value detected by the distortion sensor 33. The control circuit 53 controls the distortion sensor 33 and the transceiver 43. The battery 63 supplies electric power to the transceiver 43 and the control circuit 53. Further, the sensor unit 4 includes a lateral acceleration sensor 34; a transceiver 44; a control circuit 54; and a battery 64. The lateral acceleration sensor 34 detects the lateral acceleration of the wheel 14. The transceiver 44 transmits and receives, for example, a signal indicating the value detected by the lateral acceleration sensor 34. The control circuit 54 controls the lateral acceleration sensor 34 and the transceiver 44. The battery 64 supplies electric power to the sensor 34, the transceiver 44, and the control circuit 54.

The sensor unit 5 provided inside the TPMS valve 20 includes an air-pressure sensor 35; a transceiver 45; a control circuit 55; and a battery 65. The air-pressure sensor 35 detects the air pressure in the space 188. The transceiver 45 transmits and receives, for example, a signal indicating the value detected by the air-pressure sensor 35. The control circuit 55 controls the air-pressure sensor 35 and the transceiver 45. The battery 65 supplies electric power to the sensor 35, the transceiver 45, and the control circuit 55. The sensor unit 5 further includes an acceleration sensor 36 that detects the acceleration of the housing 21 of the TPMS valve 20, that is, the acceleration of the wheel 14. The acceleration sensor 36 is employed as the first detection means according to the invention. The acceleration sensor 36 detects the rotational state of the corresponding wheel 14, which is a parameter different from the parameters detected by the sensors 31 to 34 in the sensor units 1 to 4 and the air-pressure sensor 35. On the basis of the rotational state of the wheel 14 determined based on the value detected by the acceleration sensor 36 in the sensor unit 5, it can be determined whether the vehicle 10 is stationary or is running.

As shown in FIG. 1, an electronic control unit (hereinafter, referred to as "ECU") 100 is provided in the vehicle body 12 of the vehicle 10. The ECU 100 executes various controls using information transmitted from the transceivers 41 to 45 in the sensor units 1 to 5. The ECU 100 includes a CPU; ROM; RAM; an input/output interface; and memory. The CPU executes various calculations. The ROM stores various control programs. The RAM is used as a work area where data is stored and the programs are executed. As shown in FIG. 1, the ECU 100 is connected to a vehicle-body side communication device 101, a sensor group 102, and a warning device 103.

The vehicle-body side communication device 101 transmits signals to the transceivers 41 to 45 in the sensor units 1 to 5 provided in each wheel 14, and receives signals from the sensors. The vehicle-body side communication device 101 receives the signals that are wirelessly transmitted from the transceivers 41 to 45, and transmits the signals to the ECU 100. For example, the sensor group 102 includes a wheel speed sensor (not shown). The wheel speed sensor, provided in each wheel 14, detects the speed of each wheel 14. The warning device 103, which is controlled by the ECU 100, issues an alert when a predetermined condition is satisfied. For example, the warning device 103 may include a warning indicator provided in the instrument panel of the vehicle 10.

As described above, the sensor units 1 to 5 are provided in each wheel 14 of the vehicle 10. The sensor units 1 to 5, the ECU 100, and the like constitute the wheel condition determination apparatus according to the invention. By using the various pieces of information related to the wheel 14 obtained by the sensor units 1 to 5, the running performance and safety of the vehicle 10 can be improved. Each of the batteries 61 to 65 provided in the sensor units 1 to 5 can supply electric power for a relatively long time. However, the amount of electric power required for detection of the wheel condition and data communication needs to be minimized to determine the wheel condition stably.

Figure 4:
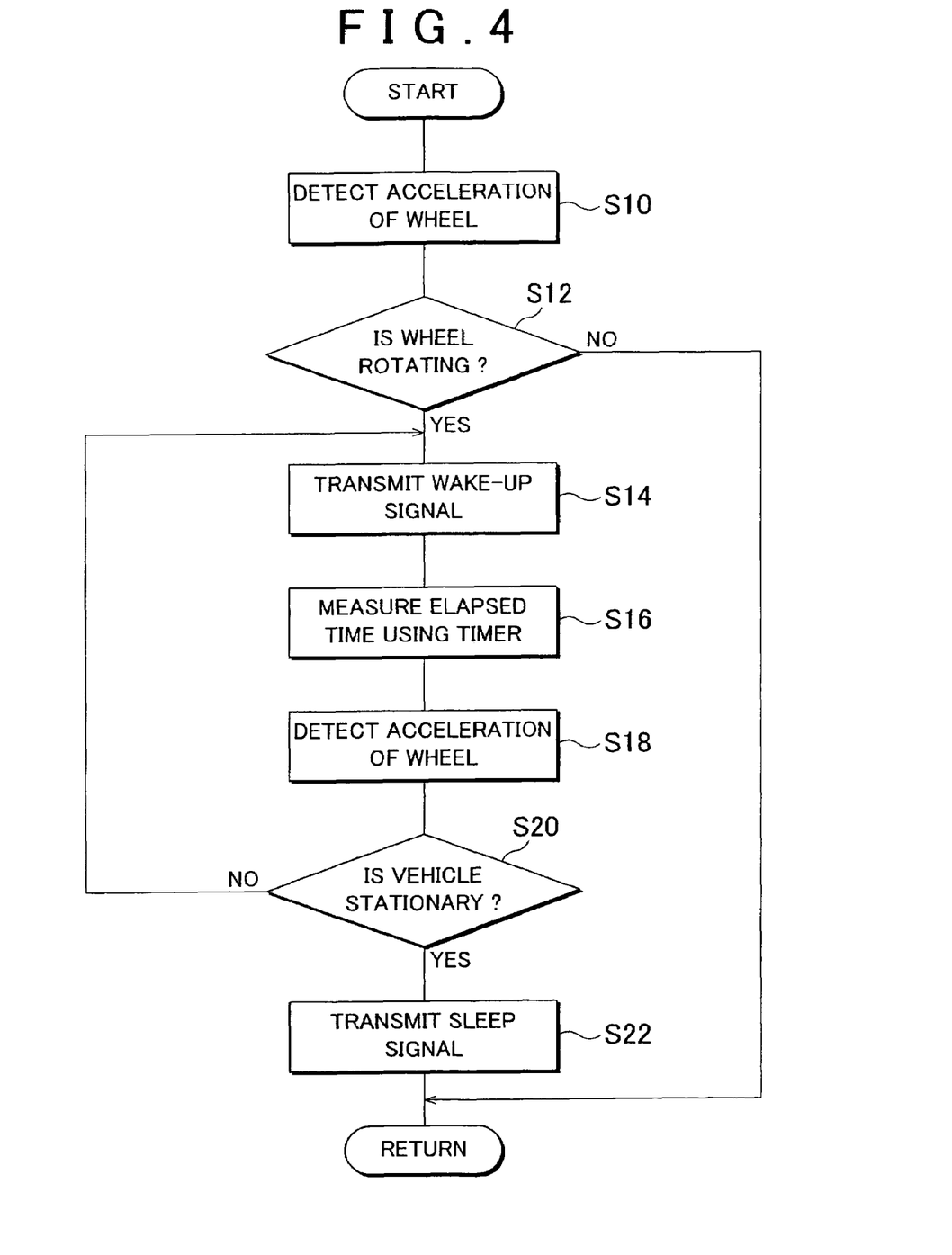
FIG. 4 illustrates a flowchart explaining a control routine that is executed by the primary sensor unit provided in each wheel of the vehicle shown in FIG. 1.
Figure 5:
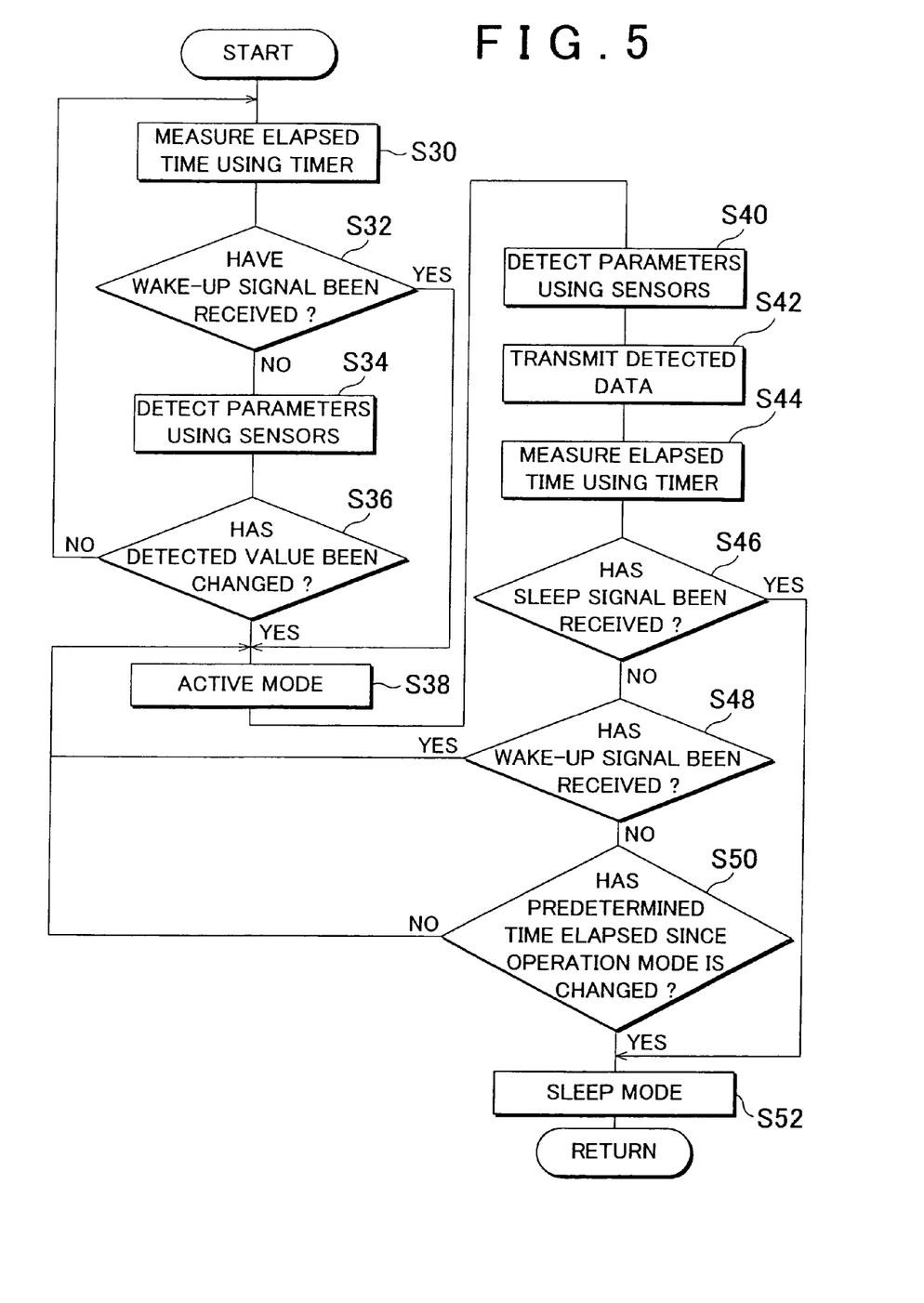
FIG. 5 illustrates a flowchart explaining a control routine that is executed by the secondary sensor unit provided in each wheel of the vehicle shown in FIG. 1.

Accordingly, in the vehicle 10, the control routines shown in FIG. 4 and FIG. 5 are executed to reduce the amount of electric power required to detect the wheel condition. FIG. 4 illustrates a flowchart explaining the control routine executed by the control circuit 55 in the sensor unit 5 provided in each wheel 14 and serves as the primary sensor unit according to the invention. FIG. 5 illustrates a flowchart explaining the control routine executed by each of the control circuits 51 to 54 in the sensor units 1 to 4. The sensor units 1 to 4 serve as the secondary sensor units according to the invention. By executing the control routines shown in FIG. 4 and FIG. 5, the operation mode of each of the sensor units 1 to 4 is changed from the active mode to the sleep mode at a predetermined time point, or when the vehicle 10 is stationary.

The control routine executed by the control circuit 55 in the sensor unit 5 provided in each wheel 14 will be described with reference to FIG. 4. The control routine in FIG. 4 is executed by the control circuit 55 in the sensor unit 5 at predetermined time intervals. As shown in FIG. 4, the control circuit 55 instructs the acceleration sensor 36 in the sensor unit 5 to detect the acceleration of the wheel 14 at a predetermined time point (S10). The acceleration sensor 36 transmits the signal indicating the detected value to the control circuit 55. The control circuit 55 determines whether the wheel 14 is rotating, that is, the vehicle 10 is in motion, based on the signal transmitted from the acceleration sensor 36 (S12). When the value indicated by the signal transmitted from the acceleration sensor 36 is smaller than a predetermined value, and the control circuit 55 determines that the wheel 14 is not rotating, that is, the vehicle 10 is stationary (NO in step S12). As such, the control circuit 55 then does not execute the processes in step S14 and subsequent steps. That is, the control circuit 55 remains in the stand-by state until the next time point at which the control routine should be started.

When the value indicated by the signal transmitted from the acceleration sensor 36 is equal to or greater than the predetermined value, and the control circuit 55 determines that the wheel 14 is rotating (YES in step S12), the control circuit 55 transmits a predetermined control signal to the transceiver 45 so that the transceiver 45 transmits a signal that sets the operation-mode of the sensor units 1 to 4 to the active mode ("WAKE-UP signal", i.e., mode-setting signal). The WAKE-UP signal sets the operation mode of the sensor units 1 to 4 in the same wheel 14 to the active mode. If the transceivers 41 to 44 in the sensor units 1 to 4 receive the WAKE-UP signal while the sensors 31 to 34 are in the sleep state, the control circuits 51 to 54 in the sensor units 1 to 4 bring the sensors 31 to 34 into the active state. If the sensors 31 to 34 are in the active state, the control circuits 51 to 54 maintain the sensors 31 to 34 in the active state.

In this embodiment, when the sensor units 1 to 4 are in the sleep mode, the sensors 31 to 34 detect the parameters indicating the wheel condition less frequently than in the active mode. Also, when the sensor units 1 to 4 are in the sleep mode, the transceivers 41 to 44 transmit data to the ECU 100 less frequently than in the active mode. Accordingly, when the sensor units 1 to 4 are in the sleep mode, the amount of electric power consumed by the sensors 31 to 34 and the transceivers 41 to 44 is greatly reduced.

After the transceiver 45 transmits the WAKE-UP signal to each of the transceivers 41 to 44, each of the sensors 31 to 34 detects the parameter indicating the wheel condition. Signals indicating the values detected by the sensors 31 to 34 are transmitted to the ECU 100 via the transceivers 41 to 44 and the vehicle-body side communication device 101. The ECU 100 on the vehicle body 12 side may then execute various controls to improve the running performance and safety of the vehicle 10 using the values detected by the sensors 31 to 34.

After the WAKE-UP signal is transmitted to each of the transceiver 45 in step S14, the control circuit 55 turns a timer (not shown) ON. The timer measures the time that has elapsed since an affirmative determination is made in steps S12 (S16). When the time measured by the timer has reached a predetermined time T1, the control circuit 55 turns the timer OFF, and causes the acceleration sensor 36 in the sensor unit 5 to detect the acceleration of the wheel 14 (S18). Then, the control circuit 55 determines whether the wheel 14 is stationary, that is, the vehicle is stationary based on the signal transmitted from the acceleration sensor 36 (S20).

When the value indicated by the signal from the acceleration sensor 36 is smaller than a predetermined value, and the control circuit 55 determines that the wheel 14 is stationary, that is, the vehicle is stationary (YES in step S20), the control circuit 55 transmits a predetermined control signal to the transceiver 45 so that the transceiver 45 transmits a SLEEP signal (mode-setting signal) (S22). The SLEEP signal sets the operation mode of each of the sensor units 1 to 4 in the same wheel 14 to the sleep mode. When the transceiver 45 transmits the SLEEP signal to each of the transceivers 41 to 44, each of the control circuits 51 to 54 brings the corresponding sensor 31, 32, 33, or 34 to the sleep state. After the control circuit 55 executes the process in step S22, the control circuit 55 executes the process in step S10 again.

When the value indicated by the acceleration sensor 36 is equal to or greater than the predetermined value, and the control circuit 55 determines that the wheel 14 is rotating (NO in step S20), that is, the vehicle is running, the control circuit 55 transmits the predetermined control signal to the transceiver 45 again so that the transceiver 45 transmits the WAKE-UP signal (mode-setting signal) in step S14. The WAKE-UP signal sets the operation mode of each of the sensor units 1 to 4 in the same wheel 14 to the active mode. Further, the control circuit 55 executes the processes in steps S16 to S20. As a result, as long as the vehicle 10 is moving, the WAKE-UP signal is transmitted from the sensor unit 5 to each of the sensor units 1 to 4 in a predetermined cycle T1 to set the operation mode of each of the sensor units 1 to 4 to the active mode.

Thus, in the wheel-condition determination apparatus, the operation mode of each of the sensor units 1 to 4 is changed from the active mode to the sleep mode based on the rotational state of the wheel 14 detected by the acceleration sensor 36 provided in the sensor unit 5. The acceleration sensor 36 is employed as the first detection means. This reduces the amount of electric power required to detect and transmit the wheel condition. That is, in the wheel 10, it is determined whether the vehicle 10 is moving based on the rotational state of the wheel as detected by the acceleration sensor 36 (S12 and S20). When it is determined that the vehicle 10 is moving (YES in step S12, NO in step S20), the transceiver 45 transmits the WAKE-UP signal that sets the operation mode of each of the sensor units 1 to 4 to the active mode (S14). When it is determined that the wheel 14 is stationary (YES in step S20), the transceiver 45 transmits the SLEEP signal that sets the operation mode of each of the sensor units 1 to 4 to the sleep mode. That is, in the vehicle 10, the parameters indicating the wheel condition are detected and transmitted less frequently when the vehicle is stationary and therefore the necessity of detecting the wheel condition is low. Accordingly, the amount of electric power consumed can be reduced when the vehicle is stationary.

In the vehicle 10, the sensor unit 5 changes the operation mode of each of the sensor units 1 to 4. The acceleration sensor 36 detects the rotational state of the wheel, which is used to determine whether the operation mode of each of the sensor units 1 to 4 needs to be changed. With this configuration, the acceleration sensor 36 needs to be provided only in the sensor unit 5. This reduces both the cost of and the space occupied by the sensor units 1 to 4 that would otherwise be needed if redundant sensors were provided in the sensor units 1 to 4. However, a plurality of sensor units (first sensor units) may be provided, and each of the plurality of the sensor units (first sensor units) includes a sensor (first detection means) that detects the parameter indicating the wheel condition that is used to determine whether the operation mode of each of the plurality of sensor units (second sensor units) needs to be changed. By using the acceleration sensor 36 that detects the rotational state of the wheel 14 as the first detection means, it can be accurately determined whether the vehicle 10 is moving or stationary.

Next, the control routine executed by the control circuits 51 to 54 in the sensor units 1 to 4 will be described with reference to FIG. 5. After the operation mode of each of the sensor units 1 to 4 is changed from the active mode to the sleep mode, the control circuits 51 to 54 in the sensor units 1 to 4 execute the control routine in FIG. 5. As shown in FIG. 5, after the operation mode of each of the sensor units 1 to 4 is changed from the active mode to the sleep mode, each of the control circuits 51 to 54 turns a timer (not shown) ON so that the timer measures the time that has elapsed since the operation mode is changed to the sleep mode (S30). When the time measured by the timer has reached a predetermined time T2 (T2>T1), each of the control circuits 51 to 54 turns the timer OFF, and determines whether the corresponding sensor unit 1, 2, 3, or 4 has received the WAKE-UP signal from the transceiver 45 (S32).

When each of the control circuits 51 to 54 determines that the corresponding sensor unit 1, 2, 3, or 4 has received the WAKE-UP signal from the transceiver 45 (YES in step S32), each of the control circuits 51 to 54 brings the corresponding sensor 31, 32, 33 or 34 to the active state. As a result, the operation mode of each of the sensor units 1 to 4 is changed to the active mode (S38). When each of the control circuits 51 to 54 determines that the corresponding sensor unit 1, 2, 3, or 4 has not received the WAKE-UP signal from the transceiver (NO in step S32), each of the control circuits 51 to 54 causes the corresponding sensor 31, 32, 33, or 34 to detect the parameter indicating the wheel condition (S34), and the corresponding sensor 31, 32, 33, or 34 transmits the signal indicating the detected value to each of the control circuits 51 to 54. When each of the control circuits 51 to 54 receives the signal from the respective sensors 31 to 34, each of the control circuits 51 to 54 calculates a difference between a value that is detected by the corresponding sensor 31, 32, 33, or 34 in the immediately preceding routine and stored in a predetermined storage area, and a value detected in the routine that is currently executed. Then, each of the control circuits 51 to 54 determines whether the difference is greater than a predetermined threshold value (S36). That is, each of the control circuits 51 to 54 determines whether the amount of change in the parameter indicating the wheel condition is greater than the predetermined threshold value (S36).

When each of the control circuits 51 to 54 determines that the difference, that is, the amount of change in the parameter indicating the wheel condition, is equal to or less than the predetermined threshold value (NO in step S36), each of the control circuits 51 to 54 turns the timer ON again, and executes step S32 and subsequent steps. Thus, in the vehicle 10, when the sensor units 1 to 4 are in the sleep mode, basically, the sensors 31 to 34 detect the respective parameters indicating the wheel condition in the relatively long cycle T2. When each of the control circuits 51 to 54 determines that the amount of change in the parameter indicating the wheel condition is greater than the threshold value (YES in step S36), each of the control circuits 51 to 54 brings the corresponding sensor 31, 32, 33, or 34 to the active state from the sleep state. As a result, the operation mode of each of the sensor units 1 to 4 is changed to the active mode (S38).

Thus, even if the control circuit 55 in the sensor unit 5 were to fail, and the sensor unit 5 was unable to transmit the WAKE-UP signal to the sensor units 1 to 4, the operation mode of each of the sensor units 1 to 4 can still be changed to the active mode. As a result, in the vehicle 10, even if a failure occurs in the control circuit 55 the sensor units 1 to 4 will continue to detect the parameters indicating the wheel condition although at a reduced frequency. As described above, the sensors 31 to 34 detect the parameters indicating the wheel condition in the relatively long cycle T2 when the sensor units 1 to 4 are in the sleep mode. Therefore, the amount of electric power required to detect the condition of the wheel can be minimized when the sensor units are in the sleep mode.

After the operation mode of each of the sensor units 1 to 4 is changed from the sleep mode to the active mode in step S38, each of the control circuits 51 to 54 instructs the corresponding sensor 31, 32, 33, or 34 to detect the parameter indicating the wheel condition (S40), and the corresponding sensor 31, 32, 33, or 34 transmits the signal indicating the detected value to the corresponding transceiver 41, 42, 43, or 44. When each of the transceivers 41 to 44 receives the signal from the corresponding sensor 31, 32, 33, or 34, each of the transceivers 41 to 44 transmits, to the vehicle-body side communication device 101, the signal indicating the value detected by the corresponding sensor 31, 32, 33, or 34 (S42). Then, each of the control circuits 51 to 54 in the sensor units 1 to 4 turns the timer (not shown) ON to measure the time that has elapsed since data is transmitted in step S42 (S44). When a predetermined time T3 has passed, each of the control circuits 51 to 54 turns the timer OFF, and determines whether the corresponding sensor unit 1, 2, 3, or 4 has received the SLEEP signal from the transceiver 45 (S46).

If each of the control circuits 51 to 54 determines that the corresponding sensor unit 1, 2, 3, or 4 has received the SLEEP signal from the transceiver 45 (YES in step S46), each of the control circuits 51 to 54 brings the corresponding sensor 31, 32, 33, or 34 to the sleep state. As a result, the operation mode of each of the sensor units 1 to 4 is changed to the sleep mode (S52). Then, each of the control circuits 51 to 54 executes the processes in step S30 and subsequent steps again.

When each of the control circuits 51 to 54 determines that the corresponding sensor unit 1, 2, 3, or 4 has not received the SLEEP signal from the transceiver 45 (NO in step S46), each of the control circuits 51 to 54 determines whether the corresponding sensor unit 1, 2, 3, or 4 has received the WAKE-UP signal from the transceiver 45 in the sensor unit 5 (S48). When each of the control circuits 51 to 54 determines that the corresponding sensor unit 1, 2, 3, or 4 has received the WAKE-UP signal from-the transceiver 45 (YES in step S48), each of the control circuits 51 to 54 executes the processes in step S38 and subsequent steps again so that the corresponding sensor unit 1, 2, 3, or 4 remains in the active mode. When each of the control circuits 51 to 54 determines that the corresponding sensor unit 1, 2, 3, or 4 has not received the WAKE-UP signal from the transceiver 45 (NO in step S48), each of the control circuits 51 to 54 determines whether a predetermined time T4 (T4>T1) has elapsed since the operation mode is changed to the active mode (S50).

If each of the control circuits 51 to 54 determines that the predetermined time T4 has not elapsed (NO in step S50), each of the control circuits 51 to 54 executes the processes in step S38 and subsequent steps so that the corresponding sensor unit 1, 2, 3, or 4 remains in the active mode. If the predetermined time T4 has elapsed (YES in step S50), each of the control circuits 51 to 54 brings the corresponding sensor 31, 32, 33, or 34 to the sleep state from the active state. As a result, the operation mode of each of the sensor units 1 to 4 is changed to the sleep mode (S52). Thus, even if a failure occurs in the control circuit 55 of the sensor unit 5, and the sensor unit 5 is unable to transmit the SLEEP signal to the sensor units 1 to 4, the sensor units 1 to 4 are still able to switch to operation in the sleep mode. This reduces the amount of electric power required to detect and transmit the wheel condition.

What is claimed is:

1. A wheel condition determination apparatus which determines a condition of a wheel provided in a vehicle, comprising:
   a primary sensor unit, provided in the wheel, which includes a first transceiver, a first detector that detects a first predetermined parameter indicating the condition of the wheel, and an operation-mode controller; and
   a secondary sensor unit, provided in the wheel, which includes a second transceiver, and a second detector that detects a second predetermined parameter indicating the condition of the wheel, which is different from the first predetermined parameter,
   wherein the operation mode controller instructs the first transceiver to generate a mode-setting signal to set an operation mode of the secondary sensor unit to one of an active mode and a sleep mode, based on the detected first predetermined parameter.

2. The wheel condition determination apparatus according to claim 1, further comprising:
   a motion determining device, provided in the primary sensor unit, which determines whether the vehicle is running based on the first predetermined parameter, wherein the operation mode of the secondary sensor unit is set in accordance with the determination made by the motion determining device.

3. The wheel condition determination apparatus according to claim 2, wherein:

the operation-mode controller instructs the first transceiver to generate a signal that sets the operation mode of the secondary sensor unit to the active mode when the motion determining device determines that the vehicle is running; and the operation-mode controller instructs the first transceiver to generate a signal that sets the operation mode of the secondary sensor unit to the sleep mode when the motion determining device determines that the vehicle is stationary.

4. The wheel condition determination apparatus according to claim 1, wherein the first detector detects a rotational state of the wheel.

5. The wheel condition determination apparatus according to claim 1, further comprising:

an operation-mode selector, provided in the secondary sensor unit, which changes the operation mode of the secondary sensor unit to from the sleep mode to the active mode when an amount of change in the second predetermined parameter exceeds a predetermined value in the sleep mode; and wherein the second detector detects the second predetermined parameter in a predetermined cycle in the sleep mode.

6. The wheel condition determination apparatus according to claim 5, wherein the operation-mode selector in the secondary sensor unit changes the operation mode from the active mode to the sleep mode after a predetermined time has elapsed since the operation mode is changed to the active mode.

7. The wheel condition determination apparatus according to claim 1, further comprising:

a plurality of secondary sensor units, wherein the primary sensor unit transmits the mode-setting signal to each of the plurality of secondary sensor units.

8. A method of determining a condition of a wheel provided in a vehicle, comprising:

detecting a first predetermined parameter indicating the condition of the wheel using a first detector provided in a primary sensor unit provided in a wheel;

generating a mode-setting signal in a first transceiver provided in the primary sensor unit, based on the detected first predetermined parameter; and transmitting the mode-setting signal to a secondary sensor unit provided in the wheel to set an operation mode of the secondary sensor unit to one of an active mode and a sleep mode, based on the first predetermined parameter.

* * * * *